US009824379B2

(12) United States Patent
Khandelwal et al.

(10) Patent No.: US 9,824,379 B2
(45) Date of Patent: *Nov. 21, 2017

(54) SYSTEM AND METHOD FOR MANAGING E-COMMERCE TRANSACTIONS

(71) Applicant: AT&T Intellectual Property I, LP, Atlanta, GA (US)

(72) Inventors: Madhur Khandelwal, Atlanta, GA (US); E-Lee Chang, Mableton, GA (US); Horst Juergen Schroeter, New Providence, NJ (US); Linda Roberts, Boynton Beach, FL (US); Darnell Clayton, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/490,768

(22) Filed: Sep. 19, 2014

(65) Prior Publication Data
US 2015/0006323 A1  Jan. 1, 2015

Related U.S. Application Data

(63) Continuation of application No. 12/262,959, filed on Oct. 31, 2008, now Pat. No. 8,874,473.

(51) Int. Cl.
*G06Q 40/00* (2012.01)
*G06Q 30/06* (2012.01)
(Continued)

(52) U.S. Cl.
CPC ..... *G06Q 30/0609* (2013.01); *G06Q 10/0637* (2013.01); *G06Q 20/12* (2013.01);
(Continued)

(58) Field of Classification Search
None
See application file for complete search history.

(56) References Cited

U.S. PATENT DOCUMENTS

| 8,874,473 B2 * | 10/2014 | Khandelwal ....... G06Q 10/0637 705/27.2 |
| 2005/0223328 A1 | 10/2005 | Ashtekar |

(Continued)

OTHER PUBLICATIONS

"Youtube", Apple Futureshock, Knowledge Navigator, 2 pages, http://www.youtube.com/watch?v=3WdS4Tscwh8, web site last visited Sep. 18, 2008.

(Continued)

*Primary Examiner* — Shay S Glass
(74) *Attorney, Agent, or Firm* — Guntin & Gust, PLC; Jay H. Anderson

(57) ABSTRACT

A system that incorporates teachings of the present disclosure may include, for example, an avatar engine having a controller to retrieve a user profile of a user, present the user an avatar having characteristics that correlate to the user profile, detect one or more responses of the user during a communication exchange between the avatar and the user, identify from the one or more responses a need to engage in an e-commerce transaction, engage in a commercial exchange with a merchant system according to the e-commerce transaction, identify a commercial status of the e-commerce transaction from the commercial exchange with the merchant system, and present the user by way of the avatar the commercial status of the e-commerce transaction. Other embodiments are disclosed.

20 Claims, 9 Drawing Sheets

(51) Int. Cl.
*G06Q 10/06* (2012.01)
*G06Q 20/12* (2012.01)
*G06Q 20/40* (2012.01)

(52) U.S. Cl.
CPC ....... *G06Q 20/123* (2013.01); *G06Q 20/4014* (2013.01); *G06Q 30/06* (2013.01); *G06Q 30/0601* (2013.01); *G06Q 30/0611* (2013.01)

(56) References Cited

U.S. PATENT DOCUMENTS

2007/0074114 A1 3/2007 Adjali
2010/0199200 A1 8/2010 Fujioka

OTHER PUBLICATIONS

Cosatto, , "From Audio-Only to Audio and Video Text-to-Speech", pp. 1084-1095, Acta Acustica United with Acustica, vol. 90, Accepted Apr. 14, 2004.
Cosatto, , "Lifelike Talking Faces for Interactive Service", pp. 1406-1429, Proceedings of the IEEE, vol. 91, No. 9, Sep. 2003.
Lively, , "Create an Avatar and Chat with your Friends in Rooms you Design", 1 page, http://www.lively.com/html/ landing.html, Web site last visited Oct. 20, 2008.
Secondllfe, , "Virtual Worlds, Avatars, 3D Chat, Online meetings", 1 page, http:/secondlife.com/ Web site last visited Oct. 20, 2008.
usatoday.com, , "Sony, Microsoft Virtual Communities to Start", 3 pages, http://www.usatoday.com/tech/ gaming/2008-1 0-09-sony-microsoft_N. htm, Web site last visited Oct. 20, 2008.
xbox.com, , "Welcome to the New Xbox Experience", 1 page, http://www.xbox.com/en-us/live/nxe/, Web site last visited Oct. 20, 2008.

\* cited by examiner

100

500

600

SYSTEM AND METHOD FOR MANAGING E-COMMERCE TRANSACTIONS

CROSS-REFERENCE TO RELATED APPLICATION(S)

This application is a continuation of U.S. patent application Ser. No. 12/262,959 filed Oct. 31, 2008, which is incorporated herein by reference in its entirety.

FIELD OF THE DISCLOSURE

The present disclosure relates generally to e-commerce transaction techniques and more specifically to a system and method for managing e-commerce transactions.

BACKGROUND

On-line commerce, which can be referred to as e-commerce, has over the years achieved widespread acceptance thanks to the expansive growth of the Internet and the growing sophistication of on-line merchant systems. Consumers today can purchase goods or services from on-line merchants over secure communication interfaces operating according to protocols such as a Hypertext Transfer Protocol Secure (HTTPS). E-commerce transactions using the HTTPS protocol usually show an iconic symbol such as a "pad lock" somewhere in the browser window to indicate to the user that the communication with the on-line merchant is secure.

Sophisticated e-commerce systems have provided users a means to purchase or sell goods by fixed price or auctioning methods. Many retailers today also offer their consumers the convenience to purchase their products over on-line systems. To enhance a user's security in e-commerce transactions, payments systems such as PayPal™ can be used to protect the privacy of sensitive consumer information such as bank accounts and credit card information during an e-commerce transaction.

DETAILED DESCRIPTION

One embodiment of the present disclosure can entail an avatar engine having a controller to retrieve a user profile of a user, present the user an avatar having characteristics that correlate to the user profile, detect one or more responses of the user during a communication exchange between the avatar and the user, identify from the one or more responses a need to engage in an e-commerce transaction, engage in a commercial exchange with a merchant system according to the e-commerce transaction, identify a commercial status of the e-commerce transaction from the commercial exchange with the merchant system, and present the user by way of the avatar the commercial status of the e-commerce transaction.

Another embodiment of the present disclosure can entail presenting a user an avatar having characteristics that correlate to a profile of the user, identifying from a communication exchange between the user and the avatar a need to engage in an e-commerce transaction, identifying a merchant system that satisfies the identified need, and engaging in a commercial exchange with the merchant system according to the e-commerce transaction.

Yet another embodiment of the present disclosure can entail a computer-readable storage medium having computer instructions for presenting a user an avatar having characteristics that correlate to a profile of the user, identifying from a communication exchange between the user and the avatar a need to engage in an e-commerce transaction, and engaging in a commercial exchange with a merchant system according to the identified e-commerce transaction.

Figure 1:
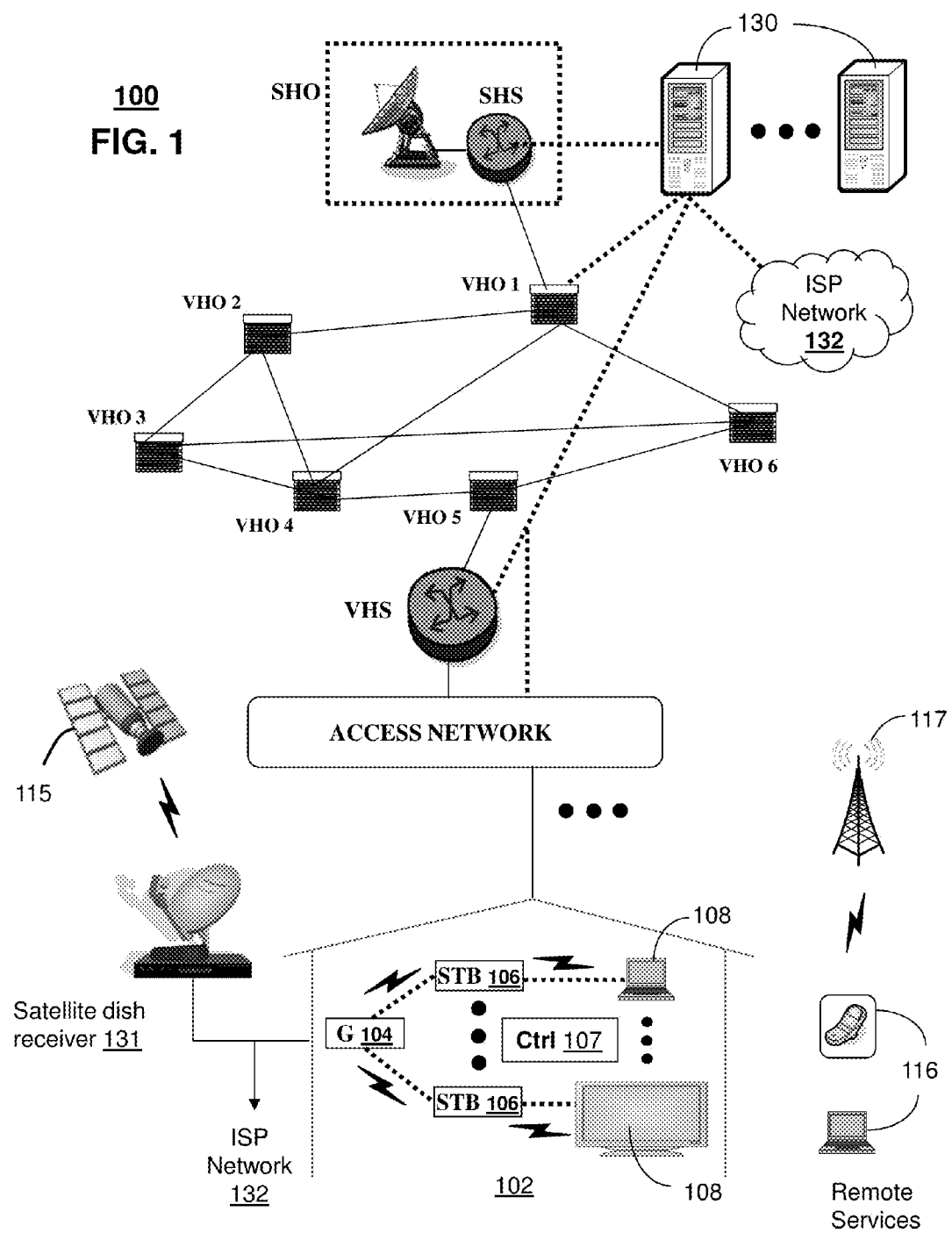
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.).

Another distinct portion of the one or more computing devices 130 can be used as an avatar engine (herein referred to as avatar engine 130) for generating and managing interactive avatars which users of the first communication system 100 can be presented for general assistance and presentation of interactive television (iTV) services as well as for engaging in e-commerce transactions on behalf of a user as described below in FIG. 7. The avatar engine 130 can use common imaging technology for creating avatars with human-like or animated qualities. The avatar engine 130 can also use common speech recognition and speech synthesis technology to produce an interactive avatar. The avatar engine 130 can employ common speech recognition technology to determine the user's needs from a communication exchange between the user and the avatar image produced by the avatar engine.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
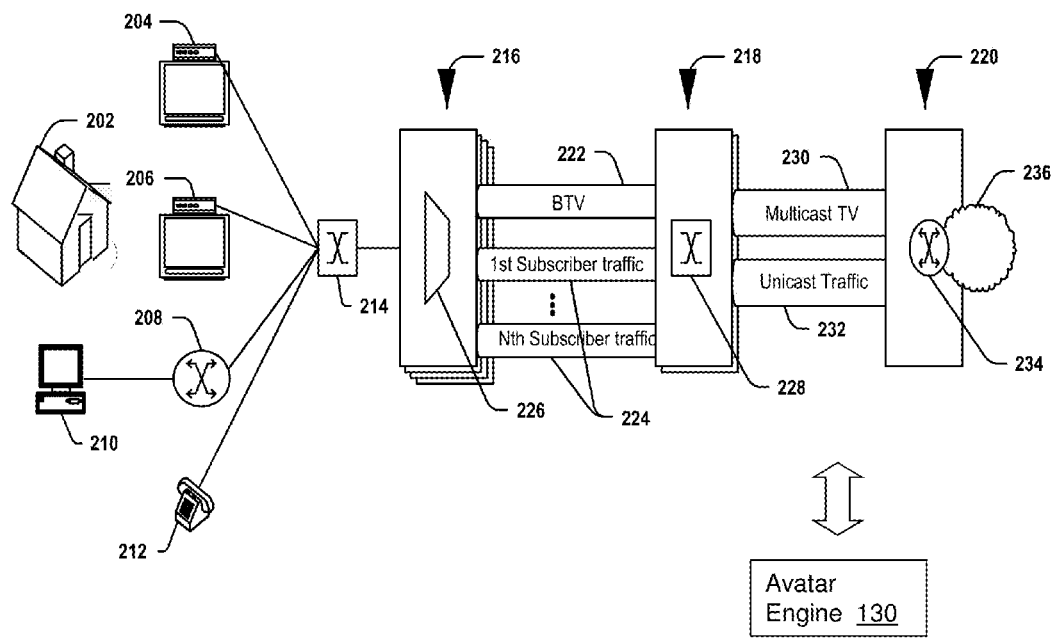

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The avatar engine 130 of FIG. 1 can be operably coupled to the second communication system 200 for purposes similar to those described above.

Figure 3:
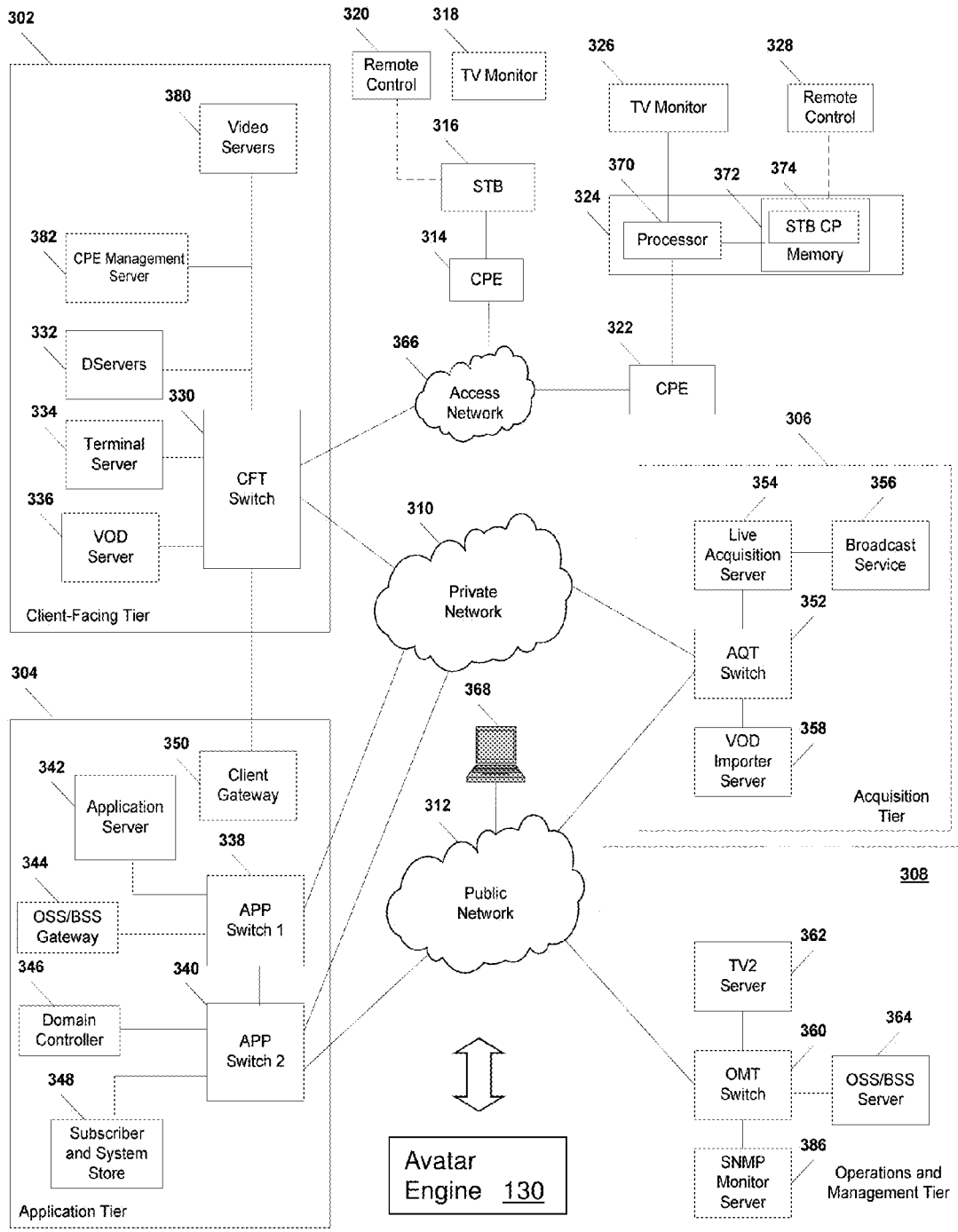

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The avatar engine 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
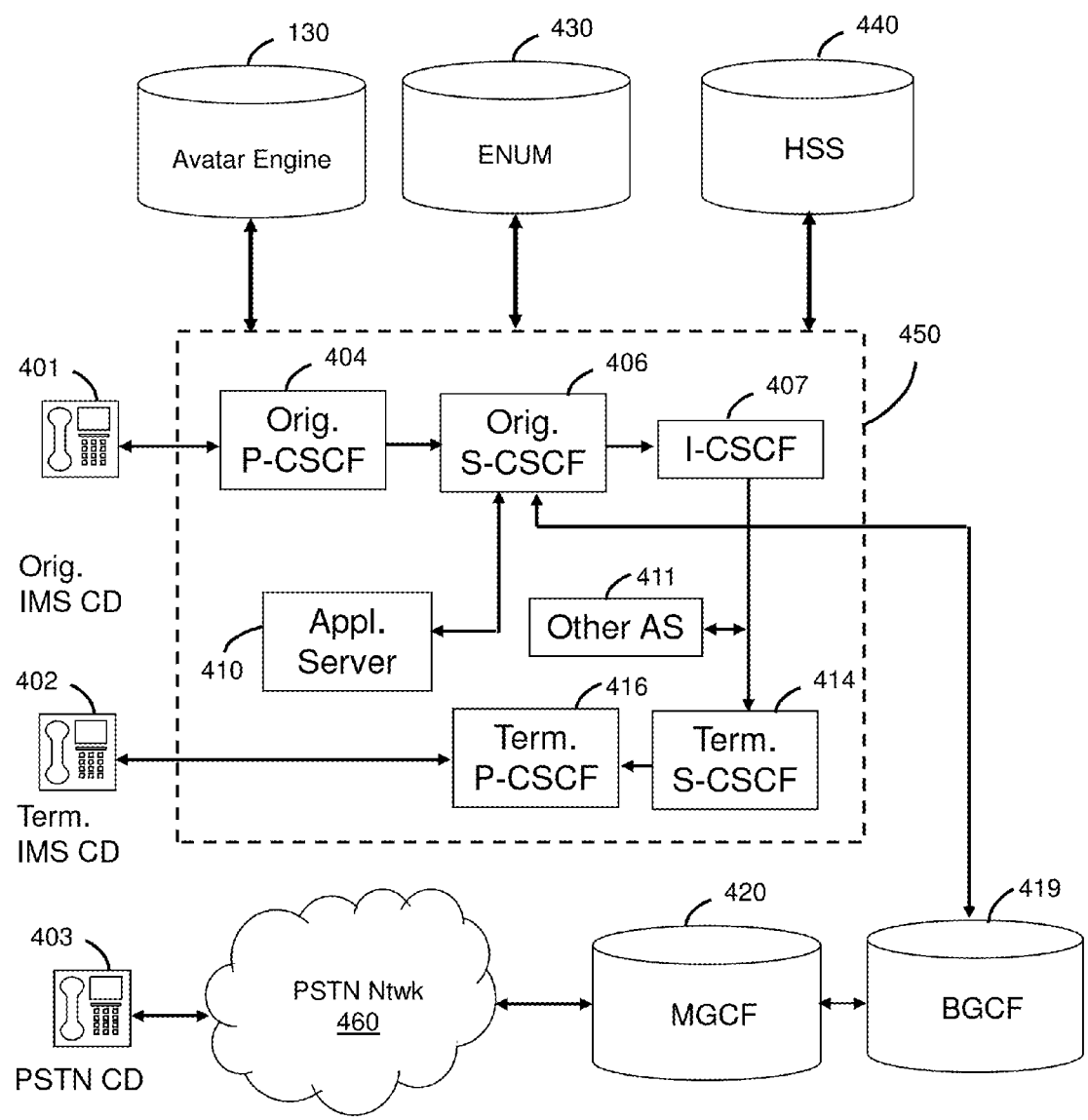

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (such as *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the avatar engine 130 previously discussed for FIG. 1. In this representative embodiment, the avatar engine 130 can be accessed over a PSTN or VoIP channel of communication system 400 by common techniques such as described above.

Figure 5:
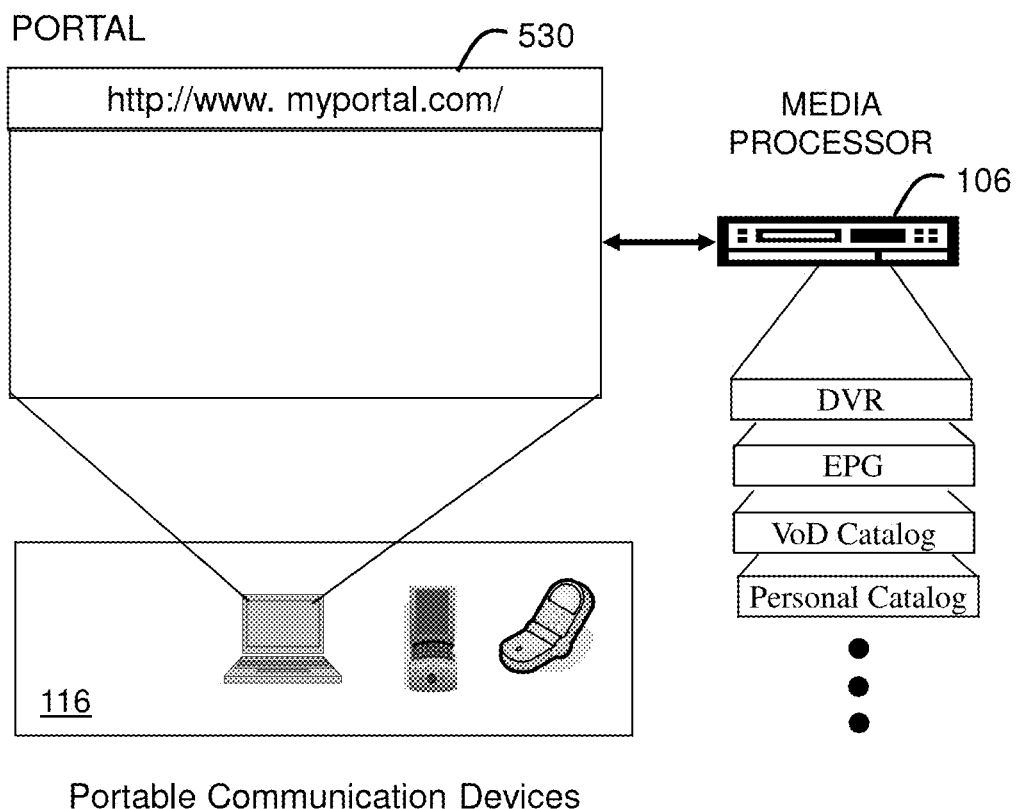
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog (such as personal videos, pictures, audio recordings, etc.) stored in the STB, a personal computer or server in a user's home or office, and so on.

Figure 6:
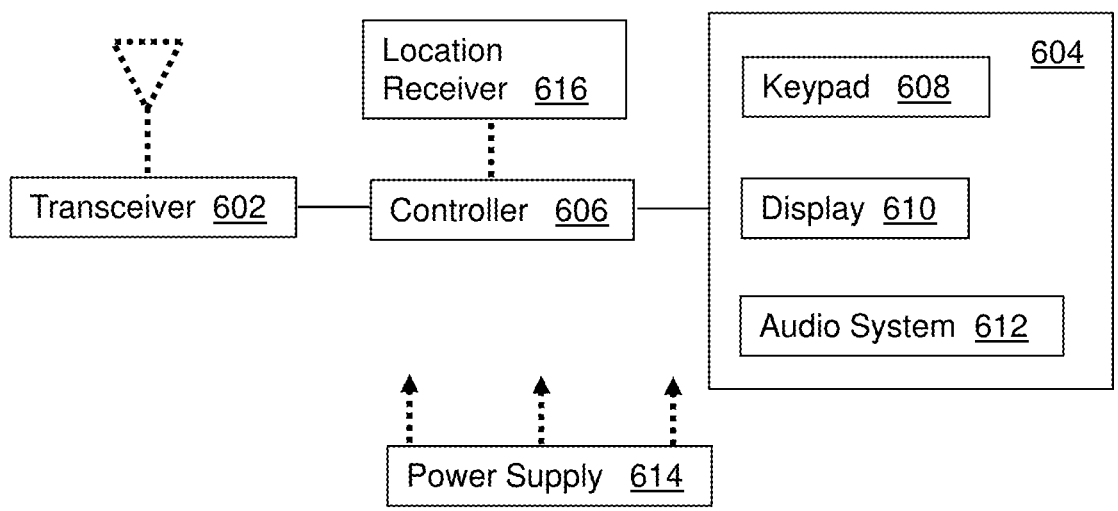
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1x, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (such as a USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (such as audio heard only in the proximity of a human ear) and high volume audio (such as speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The controller 606 can utilize computing technologies such as a microprocessor and/or digital signal processor (DSP) with associated storage memory such a Flash, ROM, RAM, SRAM, DRAM or other storage technologies.

Figure 7:
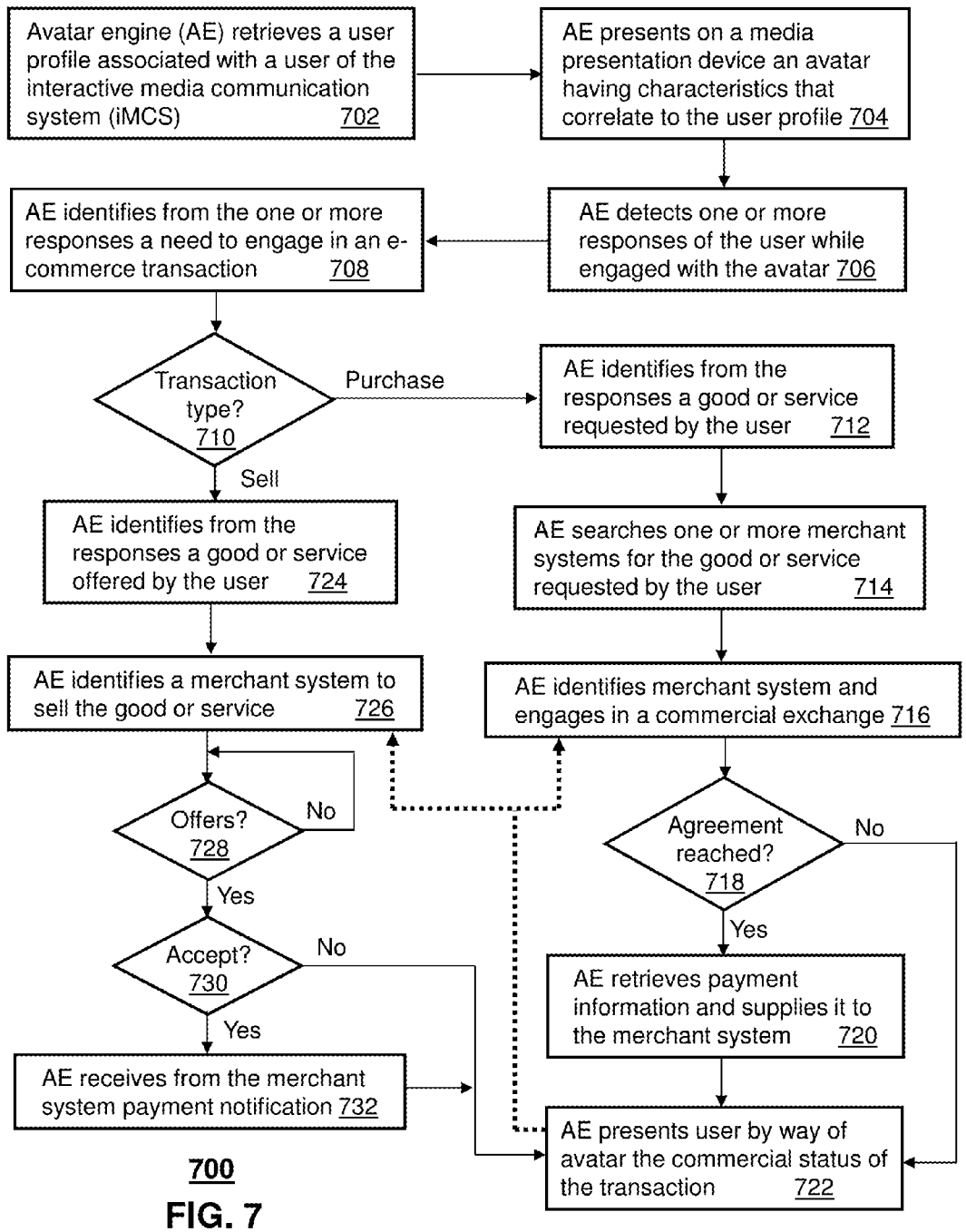
FIG. 7 depicts an illustrative embodiment of a method operating in portions of the communication systems of FIGS. 1-4.
Figure 8:
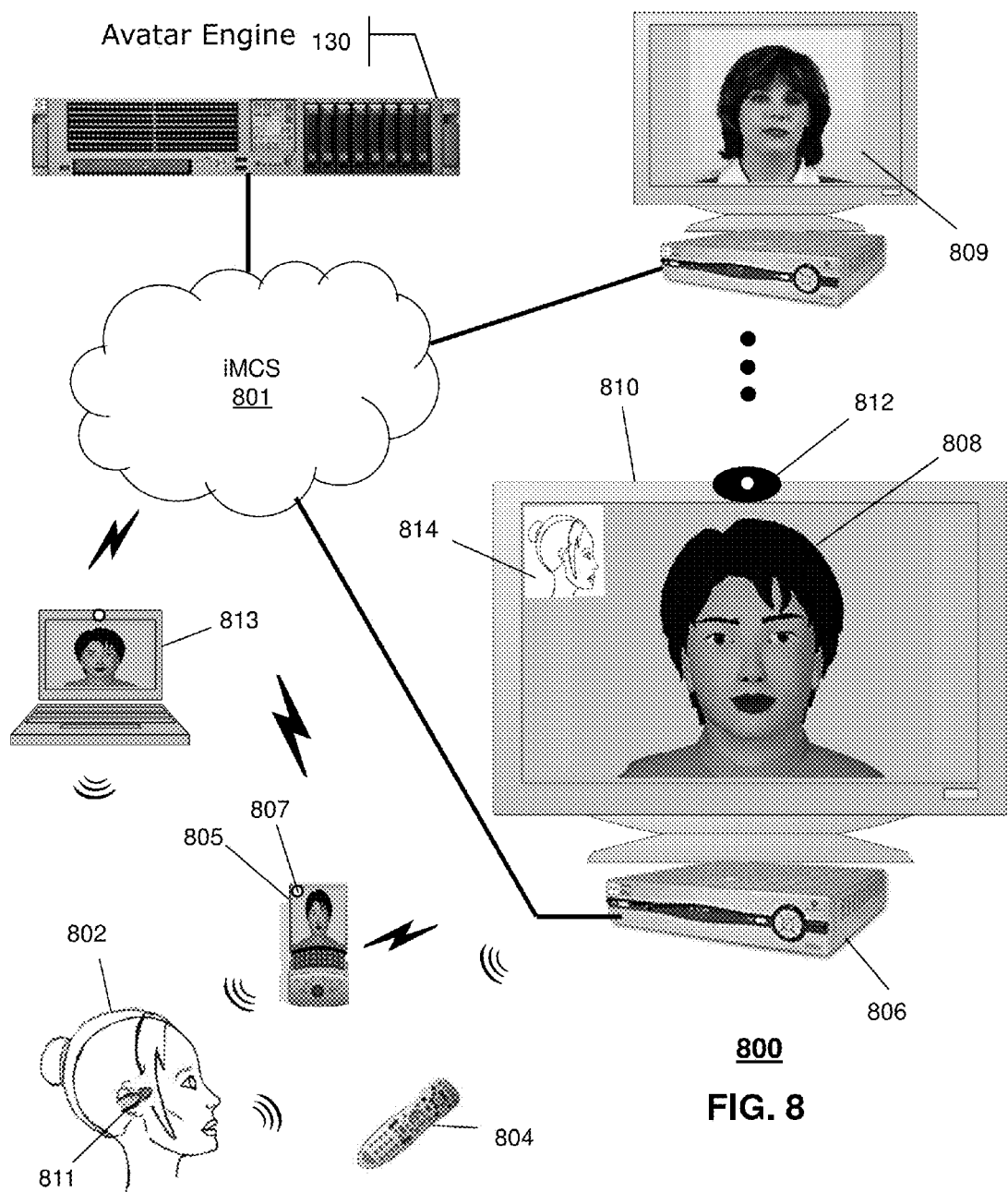
FIG. 8 depicts an illustrative embodiment of a system operating according to the method of FIG. 7.

FIG. 7 depicts an illustrative method 700 operating in portions of communication systems 100-400. FIG. 8 depicts an illustrative embodiment of a system 800 operating according to the method of FIG. 7. FIG. 8 depicts an interactive media communication system 801 such as the systems shown in FIGS. 1-4 (singly or collectively). The interactive media communication system (iMCS) can be coupled to the avatar engine 130 and one or more STBs 806. The STBs 806 can be operatively coupled to media presentation devices such as a high-definition television (HDTV) 810 which can present avatar images 808 (herein referred to as avatar 808) supplied by the avatar engine 130 by way of the STBs. A user 802 of the STB 806 can interact with the avatar 808 by speech as well as tactile controls using a remote control 804.

The HDTV 812 can also have a common camera sensor 812 for capturing still and/or moving images of the user 802, which can be displayed in part by the HDTV as a picture-in-picture (PIP) image 814. The visual images of the user can be conveyed to the STB 806. Speech can be detected by a microphone of an audio system of the remote control 804 or an audio system of the STB 806. The avatar 808 can be an animated image, or can have human-like qualities such as the avatar image 809. The STB 806 can transmit to the avatar engine 130 the visual images as well as speech signals of the user 802 for analysis.

The avatar engine 130 can also be communicatively coupled to a mobile phone 805 with a camera 807 that can convey still or moving images of the user 802 to the avatar engine. The mobile phone 805 can have an audio system for receiving responses of the user 802 and for conveying the user's speech to the avatar engine 130. The audio system can also have a loud speaker to convey to the user 802 synthesized speech of the avatar 808 for hands-free operations. To avoid disturbing others, the mobile phone 805 can also incorporate common Bluetooth wireless transceiver technology to communicate with a common Bluetooth headset 811 worn by the user 802. Similarly, the avatar engine 130 can be communicatively coupled to a computer 813 with similar resources as the mobile phone 805.

With system 800 in mind, method 700 can begin with step 702 in which the avatar engine 130 retrieves a user profile associated with the user 802 of the iMCS 801. This step can be responsive to the user 802 requesting access to the avatar 808 by initiating a speech command or tactile command (such as selecting an avatar request button on the remote control 804) that is detected by the STB 806, and thereby conveyed to the avatar engine 130. The user profile can include demographic profiling information of the user 802, psychographic profiling information of the user, and/or user preferences supplied by the user. The demographic profiling information of the user 802 can be based on age, gender, income, number of occupants in household, occupation, education, value of residential property, location of residential property, and/or fees paid for services rendered by the iMCS 801—just to name a few possibilities.

The demographic profiling information of the user 802 can be determined from a subscriber account of the user and/or monitored media consumption behavior of the user. One or more network elements of the iMCS 801 can utilize common demographic analysis tools to make these determinations.

The psychographic profiling information of the user 802 can also be determined from monitored media consumption behavior of the user and/or subscriber account information. Utilizing common psychographic analysis tools, one or more network elements of the iMCS 801 can generate the psychographic profiling information of the user 802. The psychographic profiling information can identify one or more traits, attitudes, interests, and/or lifestyles of the user 802.

User preferences supplied by the user 802 can identify, for example, a preferred gender for the avatar, a preferred image (could be an image of the user 802, an image of a friend or spouse of the user, celebrity, etc.), a preferred personality for the avatar (mild-mannered avatar), preferred search preferences, preferred content sources, preferred merchants for purchasing or selling goods or services, and so on.

In step 704 the avatar engine 130 can present on the HDTV 810 the avatar 808 correlated to the user profile as described above. The avatar engine 130 can use common correlation technology to statistically generate an avatar image that is likely suited for the user 802 according to the aforementioned aspects provided by the user profile. Using common speech synthesis and recognition technology, the avatar engine 130 can interact with the user 802 by way of the avatar 808 to provide interactive media services. The interactive function can be initiated by the user 802 with speech or tactile responses on the remote control 804 which can be detected by the avatar engine 130 in step 706 by way of the STB 806.

User responses can represent any detectable visual or audible response of the user 802 determined from an exchange between the user and the avatar engine 130 by way of the avatar 808. A response for example can represent a command such as, "Show me my DVR recordings," "Record this program," Show me the EPG for HD channels," Show me the VoD catalog for family movies," "Show me YouTube.com", "Show me contemporary music in iTunes™", "What's the weather like outside?", "What's the weather forecast for the next three days?", "Where can I buy Spencer Tracy movies", "Please auction my five Spiderman comic books on eBay™. Accept only bids that exceed $200 per comic book. You can find detailed information about each comic book and visual images in my Spiderman folder, which you can use to display on eBay™", "Please purchase a 3G iPhone™ on-line if you find one with 16 Gbytes of memory, and XXX features for less than $250", and so on.

The avatar engine 130 thus can be programmed, for example, to identify in step 708 from the user's responses a need to engage in an e-commerce transaction. E-commerce transactions can represent any commercial transaction for purchasing or selling goods or services over a communication system such as the Internet. In step 710, the avatar engine 130 can determine from the user's responses whether the transaction is a purchase or sale. If the transaction is a purchase, the avatar engine 130 can proceed to step 712 where it can identify from the responses a good or service requested by the user 802. Assume for illustration purposes that the user 802 has requested an on-line purchase of the iPhone™ as described above. In step 714, the avatar engine 130 can search one or more merchant systems for the iPhone™.

A merchant system in the present context can mean any on-line system capable of engaging in e-commerce transactions with other on-line systems such as the avatar engine 130. Each of the merchant systems can define an Application Programming Interfaces (API) which can be made publically available so that programmers can program the avatar engine 130 to engage in e-commerce transactions without manual intervention as described below.

The search procedure employed by the avatar engine 130 in step 714 can be based on preferences supplied in the user profile of step 702 and/or observed behaviors of the user 802 monitored by the avatar engine and recorded in a behavioral profile. The avatar engine 130 can search for known sources for the iPhone™, such as AT&T and Apple, as well as search for ad hoc sources for the phone such as eBay™. The avatar engine 130 can determine from on-line merchant systems managed by these sources which of the merchant systems offers the best price for the iPhone™ with the desired features outlined by the user. The avatar engine 130 can also explore which merchant system can most reliably provide what the merchant system (or sellers associated therewith—as in the case of eBay) is offering, which merchant system provides the better money-back guarantee, which merchant system is able to combine a discount for phone services with a purchase of the iPhone™, and so on. Based on the observed behavior of the user 802 from prior e-commerce transactions, the avatar engine 130 can apply a weight of importance to these additional factors explored with each merchant system.

When the avatar engine 130 determines that one of the merchant systems has an offer that stands out from the rest, the avatar engine can proceed to step 716 where it engages with said system in a commercial exchange. On the other hand, if the avatar engine 130 determines that more than one merchant system offers adequate deals for the iPhone™, then the avatar engine can present the user by way of the avatar 808 the available options to purchase the phone accompanied with a request for instructions from the user. Under these circumstances, the user 802 can select a merchant from the options provided, which can trigger the avatar engine 130 to proceed to step 716 as described above. Alternatively, the user 802 can select more than one merchant which can cause the avatar engine 130 to negotiate with more than one merchant system contemporaneously. In yet another embodiment, the user profile can be used by the avatar engine 130 to identify preferred merchants, a priority of merchants, or a directive to randomly choose merchants when there is more than one adequate offer without disturbing the user 802.

Once the avatar engine 130 has transitioned to step 716, it can engage in a commercial exchange in any suitable manner that serves the best interests of the user 802. For example, if the merchant system supports an auctioning process, the avatar engine 130 can offer a bid for the iPhone™ at a price that can be less than the price limit set by the user 802 (for example, $200). The avatar engine 130 can then engage in a bidding exchange with the merchant system against others bidders vying for the purchase of the same product. If, however, the merchant system offers the iPhone™ at a fixed price, the avatar engine 130 can accept the price in step 718 if it meets the user's criteria, and proceed to step 720 to consummate the purchase.

Once the merchant system and the avatar engine 130 reach an agreed price at step 718, the avatar engine retrieves payment information in step 720 from a database or other suitable payment data source and supplies this information to the merchant system to complete the purchase. The payment information can represent credit card information, bank account information, or other suitable forms of payment data. To add security to the payment process, the avatar engine 130 can instead engage an intermediary payment system (such as PayPal™) to fulfill the payment process without divulging sensitive information to the merchant system or its users.

Once the product has been purchased, the avatar engine 130 can generate a commercial status for the transaction and communicate said status in step 722 by way of the avatar 808. The commercial status can notify the user 802 that the good or service requested has been found, that the good or service requested has been carried out (or not and why), and/or that the merchant (by way of the merchant system) has proposed a purchase price that is beyond an agreed limit set by the user. The latter notification can occur if in step 718, the avatar engine 130 cannot reach agreement with the merchant system such as in a bidding process where the bids exceed the purchase price limit set by the user 802. In this instance, the user 802 can be notified by the avatar engine 130 by way of the avatar 808, and if desired the user can raise the limit, thereby re-engaging the avatar engine 130 in the bidding process started at step 716.

Referring back to step 710, the avatar engine 130 can instead detect that the user 802 wants to sell a good or service identified in step 724 as, for example, the Spiderman comic book collectibles. From the responses of the user 802, the avatar engine 130 can also determine whether the user wants to sell the goods or services at a fixed price or auction. Depending on this determination, the avatar engine 130 can identify one or more merchant systems from a random search, preferences identified in the user profile, or a behavioral profile generated by the avatar engine from historical observations of the user's behavior in prior e-commerce transactions. For example, the behavioral profile can identify eBay™ as a preferred merchant system of the user for auctions or fixed sale transactions. The user profile might however identify on-line merchant systems specializing in comic book exchanges as a preference over a general purpose merchant system such as eBay™.

Once the avatar engine 130 identifies a merchant system in step 726 according to the above determinations it can inform the merchant system of the parameters for the sale such as, for example, the fixed price to be offered, a minimum price floor in an auction sale, delivery charges, warranty terms, marketing images of the good or service offered that can be displayed by the merchant system, and so on. In step 728, the avatar engine 130 can monitor offers received by the merchant system. The avatar engine 130 accept or reject the offers in step 730. If a purchaser's offer is accepted, the avatar engine 130 can proceed to step 732 where it awaits payment notification from the merchant system. Once payment notification is received, the avatar engine 130 can generate a commercial status for the transaction which is communicated to the user 802 by way of the avatar 808 in step 722. The commercial status can, for example, indicate that one or more of the comic books were sold, the sale price of the items sold, and an account balance after commission paid to the merchant system as well as other transactional expenses such as a sales tax.

If the offer is not accepted by the avatar engine 130 because for example the offer is below the minimum price established by the user, the avatar engine can proceed to step 722 where it informs the user by way of the avatar 808 of a counteroffer, and awaits directions from the user. If the user accepts the counteroffer, the avatar engine 130 can direct the merchant system in step 726 to accept the offer and consummate the sale.

Upon reviewing the aforementioned embodiments, it would be evident to an artisan with ordinary skill in the art that said embodiments can be modified, reduced, or enhanced without departing from the scope and spirit of the claims described below. For example, method 700 can be applied to any communication device (such as a computer, STB, cell phone, IMS or VoIP phone) communicatively coupled to the avatar engine 130.

In another embodiment, the avatar engine 130 can be integrated in any communication device. For example, the avatar engine 130 can be an integral part of the STB 806, a mobile phone, a PDA, a gaming console, a communication device of an IMS system such as shown in FIG. 4, a portal, and so on. Additionally, the avatar engine 130 can be distributed between devices. In this embodiment, a portion of the avatar engine 130 can operate in a network element of the iMCS 801, while another portion operates in another communication device.

It should be apparent from these illustrations that other suitable modifications can be applied to the present disclosure without departing from the scope of the claims below. Accordingly, the reader is directed to the claims section for a fuller understanding of the breadth and scope of the present disclosure.

Figure 9:
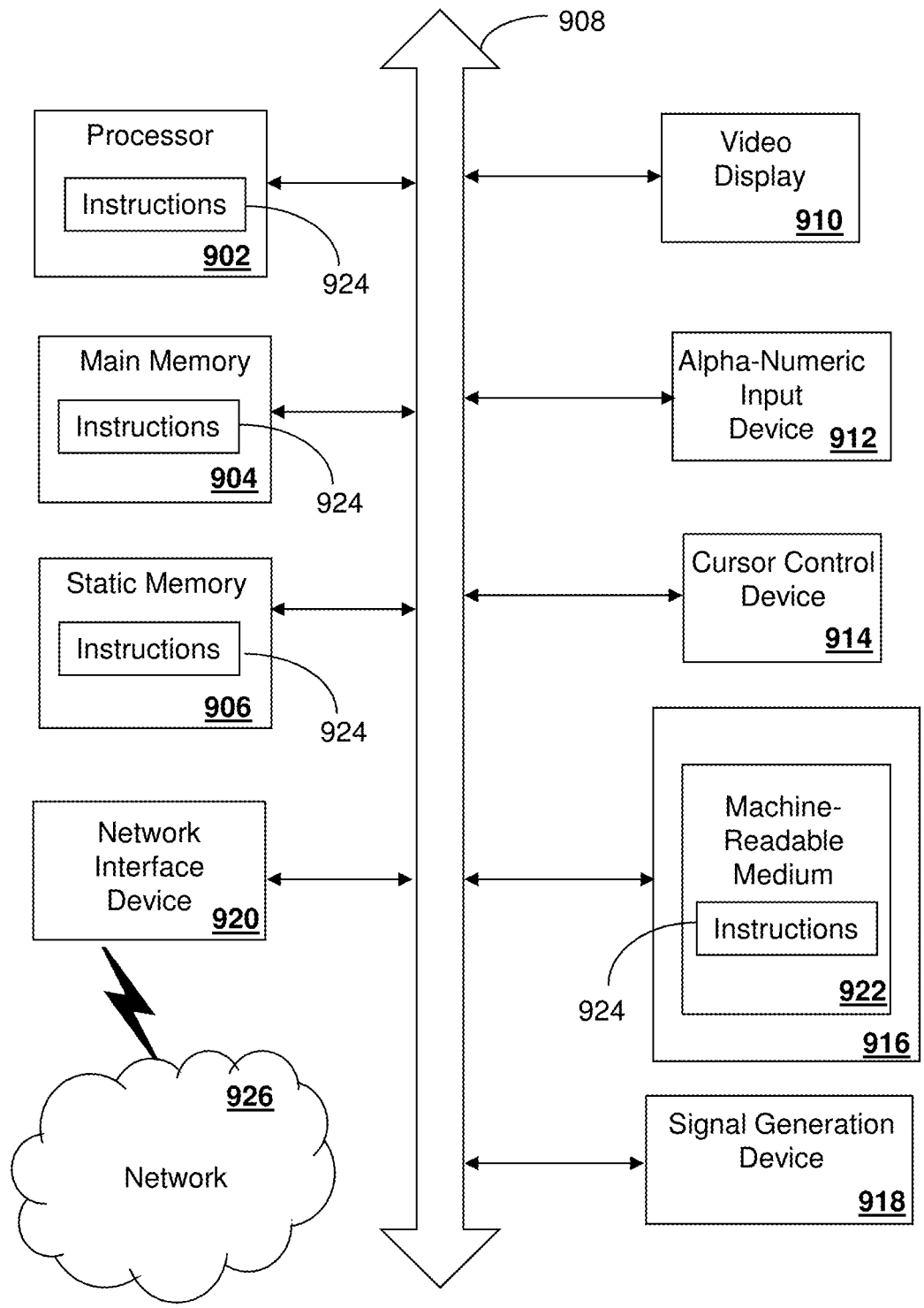
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
a processing system including a processor; and
a memory that stores executable instructions that, when executed by the processing system, facilitate performance of operations comprising:
  verifying billing information and subscription status of a user device;
  selecting an animated avatar image and preferred personality for the avatar based on a user profile comprising user preferences supplied by the user device;
  instructing an avatar system to present, at a display of the user device, the animated avatar image having the preferred personality;
  receiving, from the avatar system, a first user-generated response resulting from the presentation of the animated avatar image;
  detecting, from the first user-generated response, a desire to engage in a commercial transaction according to a negotiation criteria;
  identifying, from prior commercial transactions, a preferred group of merchant systems;
  obtaining authorization information for initiating a commercial exchange with the preferred group of merchant systems according to the negotiation criteria;
  responsive to the obtaining of the authorization information, instructing the avatar system to engage in the commercial exchange with the preferred group of merchant systems according to the negotiation criteria without processing additional user-generated responses from the user device, wherein the commercial exchange includes the avatar system exchanging messages with the preferred group of merchant systems without presenting the animated avatar image to the preferred group of merchant systems, wherein the messages conform to an application programming interface of the preferred group of merchant systems, wherein the avatar system exchanges messages with the preferred group of merchant systems to obtain a desired commercial result from at least one merchant system of the preferred group of merchant systems, and wherein the desired commercial result is based on price, guarantee, reliability or a combination thereof;
  responsive to receiving a first notice from the avatar system that the avatar system has obtained the desired commercial result from more than one merchant system of the preferred group of merchant systems:
    instructing the avatar system to present, at the display of the user device, a first adaptation of the animated avatar image that conveys a first request for a first selection from a listing of the more than one merchant system of the preferred group of merchant systems;
    receiving, from the avatar system, a second user-generated response corresponding to a first merchant system selected from the listing of the more than one merchant system; and
    instructing the avatar system to complete the commercial transaction with the first merchant system according to the negotiation criteria;

responsive to receiving a second notice from the avatar system that the avatar system cannot obtain the desired commercial result from the preferred group of merchant systems:
  instructing the avatar system to present, at the display of the user device, a second adaptation of the animated avatar image that conveys a second request for a second selection from the preferred group of merchant systems;
  receiving, from the avatar system, a third user-generated response corresponding to a second merchant system selected from the preferred group of merchant systems and a modification of the negotiation criteria resulting in updated negotiation criteria; and
  instructing the avatar system to complete the commercial transaction with the second merchant system according to the updated negotiation criteria.

2. The device of claim 1, wherein the authorization information is received from the user device, wherein the operations further comprise identifying a status of the commercial transaction from the commercial exchange with the group of merchant systems at a conclusion of the exchanging messages, and wherein the processor comprises a plurality of processors operating in a distributed processing environment.

3. The device of claim 2, wherein the operations further comprise:
  determining preferred merchants from the user profile;
  selecting the preferred group of merchant systems from a plurality of merchant systems based on the preferred merchants; and
  presenting at the user device by way of the animated avatar image the status of the commercial transaction.

4. The device of claim 2, wherein the operations further comprise purchasing from the one merchant system a good or service requested by the user device, wherein the obtaining of the desired commercial result includes applying a weighting factor to each of the price, the guarantee and the reliability.

5. The device of claim 4, wherein the commercial exchange comprises:
  the controller retrieving payment information; and
  the controller providing the payment information to the one merchant system to carry out the purchase.

6. The device of claim 4, wherein the operations further comprise:
  searching merchant systems for the good or service requested; and
  identifying the preferred group of merchant systems from the search.

7. The device of claim 1, wherein the first user-generated response represents a command for information regarding a good or service.

8. The device of claim 1, wherein the animated avatar image has characteristics corresponding to physiological appearance, speech, and gestures correlated to the user profile.

9. The device of claim 1, wherein the user profile further comprises demographic information of a user, or psychographic information of the user.

10. The device of claim 1, wherein the operations further comprise managing the commercial exchange with the merchant system according to the user profile, a behavioral profile of a user associated with the user device, and communication exchanges between the avatar system and the user device.

11. A machine-readable storage medium comprising executable instructions that, when executed by a processing system including a processor, facilitate performance of operations comprising:
  verifying billing information and subscription status of a user device;
  selecting an animated avatar image and preferred personality for the avatar based on a user profile comprising user preferences supplied by the user device;
  presenting an animated avatar image having the preferred personality for display at the user device;
  receiving a first user generated response to the presentation;
  determining, from the first user generated response, an opportunity to engage in a commercial transaction according to negotiation criteria received with the first user generated response;
  obtaining authorization information for conducting a commercial exchange with a group of merchant systems according to the a negotiation criteria; and
  in response to the obtaining of the authorization, engaging in the commercial exchange with the group of merchant systems contemporaneously, without interaction with the user device, wherein the commercial exchange includes exchanging messages through an application programming interface of the group of merchant systems, wherein the exchanging messages seeks a desired commercial result from at least one merchant system of the group of merchant systems, wherein the desired commercial result is based on price, guarantee, reliability or a combination thereof;
  in response to obtaining the desired commercial result from more than one merchant system:
    presenting a first adaptation of the animated avatar image for display at the user device that conveys a first request for a first selection of a merchant system in the group of merchant systems,
    receiving a second user generated response corresponding to a first merchant system selected from the group of merchant systems, and
    exchanging messages through the application programming interface of the first merchant system to complete the commercial transaction according to the negotiation criteria; and
  in response to failing to obtain the desired commercial result from any merchant system in the group of merchant systems:
    presenting a second adaptation of the animated avatar image for display at the user device that conveys a second request for a second selection of a merchant system in the group of merchant systems and a modification of the negotiation criteria,
    receiving a third user generated response corresponding to a second merchant system selected from the group of merchant systems and updated negotiation criteria, and
    exchanging messages through the application programming interface of the second merchant system to complete the commercial transaction according to the updated negotiation criteria.

12. The machine-readable storage medium of claim 11, wherein the operations further comprise identifying a status of the commercial transaction from the commercial exchange with the group of merchant systems at a conclusion of the exchanging messages, and wherein the processor comprises a plurality of processors operating in a distributed processing environment.

13. The machine-readable storage medium of claim 12, wherein the operations further comprise:
    determining preferred merchants from the user profile;
    selecting the group of merchant systems from a plurality of merchant systems based on the preferred merchants; and
    presenting at the user device by way of the animated avatar presentation the status of the commercial transaction.

14. The machine-readable storage medium of claim 12, wherein the operations further comprise purchasing from the one merchant system a good or service requested by the user device, wherein the obtaining of the desired commercial result includes applying a weighting factor to each of the price, the guarantee and the reliability.

15. The machine-readable storage medium of claim 11, wherein the user device comprises a remote control device coupled to a set top box, a mobile phone, or a personal computer.

16. The machine-readable storage medium of claim 11, wherein the processor and the user device are communicatively coupled via an interactive media communication system.

17. A method comprising:
    selecting, by a processing system including a processor of a server with an avatar engine executing thereon, an animated avatar image and preferred personality for an avatar based on a user profile comprising user preferences supplied by a user device;
    providing, by the processing system to a display of the user device via the avatar engine, an animated avatar image presentation comprising the preferred personality;
    identifying, by the processing system, negotiation criteria for a commercial transaction with a group of merchant systems from a user-generated response to the animated avatar image presentation;
    obtaining, by the processing system from the user device, authorization for a commercial exchange with the group of merchant systems according to the negotiation criteria; and
    in response to the obtaining of the authorization, engaging, by the processing system, in the commercial exchange with the group of merchant systems according to the negotiation criteria without interaction from the user device, wherein the commercial exchange includes the avatar engine exchanging messages with the group of merchant systems without presenting the animated avatar image to the group of merchant systems, wherein the messages conform to an application programming interface of the group of merchant systems, wherein the avatar engine exchanges messages with the group of merchant systems to obtain a desired commercial result from at least one merchant system of the group of merchant systems, wherein the desired commercial result is based on price, guarantee, reliability or a combination thereof;
    responsive to the avatar engine obtaining the desired commercial result from more than one merchant system of the group of merchant systems:
        providing, by the processing system to the display of the user device via the avatar engine, a first adaptation of the animated avatar image that conveys a first request for a first selection from a list of the more than one merchant system of the group of merchant systems;
        receiving, by the processing system, a second user-generated response corresponding to a first merchant system selected from the list of the more than one merchant system; and
        completing, by the processing system, the commercial transaction with the first merchant system according to the negotiation criteria;
    responsive to the avatar engine unable to obtain the desired commercial result from the group of merchant systems:
        providing, by the processing system to the display of the user device via the avatar engine, a second adaptation of the animated avatar image that conveys a second request for a second selection from the group of merchant systems;
        receiving, by the processing system, a third user-generated response corresponding to a second merchant system selected from the group of merchant systems and a modification of the negotiation criteria resulting in updated negotiation criteria; and
        completing, by the processing system, the commercial transaction with the second merchant system according to the updated negotiation criteria.

18. The method of claim 17, further comprising identifying, by the processing system, a status of the commercial transaction from the commercial exchange with the group of merchant systems at a conclusion of the exchanging messages.

19. The method of claim 18, further comprising:
    determining, by the processing system, preferred merchants from the user profile;
    selecting, by the processing system, the group of merchant systems from a plurality of merchant systems based on the preferred merchants; and
    providing, by the processing system, to the user device by way of the animated avatar image presentation the status of the commercial transaction.

20. The method of claim 17, further comprising managing, by the processing system, the commercial exchange with the merchant system according to the user profile, a behavioral profile of a user associated with the user device, and communication exchanges between the avatar engine and the user device.

* * * * *